(12) United States Patent
Hendriks

(10) Patent No.: US 6,995,929 B2
(45) Date of Patent: Feb. 7, 2006

(54) OBJECTIVE LENS FOR SCANNING OPTICAL DISKS (DVDS)

(76) Inventor: Bernardus Hendrikus Wilhelmus Hendriks, Prof. Holstlaan 6, 5656 AA Eindhoven (NL)

( * ) Notice: Subject to any disclaimer, the term of this patent is extended or adjusted under 35 U.S.C. 154(b) by 0 days.

(21) Appl. No.: 10/498,964

(22) PCT Filed: Dec. 9, 2002

(86) PCT No.: PCT/IB02/05317

§ 371 (c)(1),
(2), (4) Date: Jun. 16, 2004

(87) PCT Pub. No.: WO03/054591

PCT Pub. Date: Jul. 3, 2003

(65) Prior Publication Data

US 2005/0083580 A1 Apr. 21, 2005

(30) Foreign Application Priority Data

Dec. 21, 2001 (EP) .................................. 01205145

(51) Int. Cl.
*G02B 13/18* (2006.01)
*G02B 9/00* (2006.01)
*G11B 7/135* (2006.01)

(52) U.S. Cl. ................. 359/719; 359/796; 369/112.08; 369/112.13

(58) Field of Classification Search ........... 369/112.13, 369/112.12, 112.11, 112.08, 112.07, 112.06; 359/642, 718, 719, 741, 796
See application file for complete search history.

(56) References Cited

U.S. PATENT DOCUMENTS 4,938,573 A * 7/1990 Saito ........................ 359/719

* cited by examiner

Primary Examiner—Georgia Epps
Assistant Examiner—William Choi

(57) ABSTRACT

An objective lens for scanning DVD and HD-DVD optical disks, comprising a first part and a second part, wherein said first part is shaped to comprise a first surface and an opposing second surface, said second part is shaped to comprise a third surface and an opposing fourth surface, said first surface is of a convex shape providing a main part of the lens power, said third surface is shaped to fit said first surface, and wherein said fourth surface is a generally aspherical surface, said second part being formed of synthetic resin material and said first part being formed of a material having a refractive index $n_1$ having a value between 1.65 and 2, wherein the Abbe number $V_1$ of the first part and the Abbe number $V_0$ of the second part comply with the following relation (Formula I).

8 Claims, 2 Drawing Sheets

OBJECTIVE LENS FOR SCANNING OPTICAL DISKS (DVDS)

Figure 1:
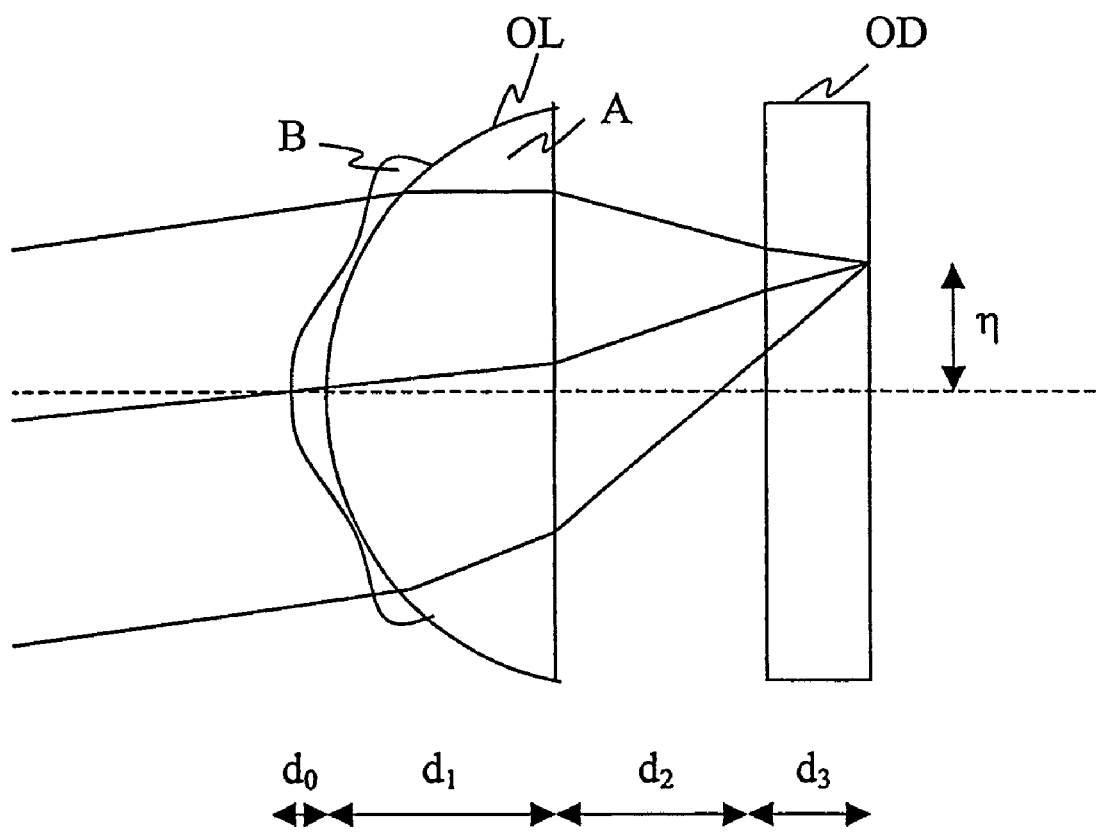

This invention relates to an optical element and an optical scanning device, and in particular but not exclusively to the scanning of optical record carriers of different formats.

Generally, it would be desirable to provide an optical scanning device, and an objective lens therefor, capable of reading out from two different relatively high density formats, i.e. higher density than the CD format.

Due to the introduction of the blue semiconductor laser (wavelength, λ=405 nm) new options to further increase the density on an optical disk compared to the conventional Digital Versatile Disk CVD) (which uses a red laser, λ=660 nm) emerge. One option is the High Density-DVD (HD-DVD) system in which the wavelength is reduced from 660 nm to 405 nm but the thickness of the cover layer of the disk is the same as for the DVD system, namely 0.6 mm. A dual layer DVD can not readily be read using a blue laser. The reason for this is that the semi-reflective layer for dual layer DVD is made of gold, silicon and silicon carbide. For 650 nm the reflectivity of both layers is ~30%. For 405 nm the absorption of gold becomes >50% and its reflectivity <10%.

It would be desirable to provide an optical scanning device which includes both a red laser and a blue laser. However, by changing the wavelength of radiation being used for read out, due to spherochromatism the amount of spherical aberration generated by the objective in general changes and also the amount of spherical aberration introduced by the cover layer of the disk.

The paper "Objective lenses for red and blue lasers" by N. Murao et al. in the proceedings of the ODF2000 conference page 321–324, describes three possible lenses for use in DVD and HD-DVD compatibility: (1) a glass doublet lens, (2) a photo-polymer doublet lens and (3) a diffractive optical element. A glass doublet lens is expensive to make and therefore not a practical solution for mass production. A diffractive optical element solution leads to losses in efficiency because in general it is not possible to realise such an element with 100% efficiency in the designed diffraction order for both the DVD configuration and the HD-DVD configuration. Furthermore, the efficiency loss increases due to manufacturing tolerances. A photo-polymer doublet lens as proposed includes a glass moulded aspherical lens with on the side facing the disk an additional photo-polymer material. A drawback of this solution is that one first has to make an aspherical lens and then as a second step add the photo-polymer material, making the lens more expensive.

It would be desirable to provide an objective lens compatible with two relatively high density formats, such as DVD and HD-DVD, without introducing undesirable costs or undesirable losses in efficiency.

In accordance with the present invention there is provided an optical element comprising a first part and a second part, wherein said first part is shaped to comprise a first surface and an opposing second surface, said second part is shaped to comprise a third surface and an opposing fourth surface, said first surface is of a convex shape providing a main part of the lens power, said third surface is shaped to fit said first surface, and wherein said fourth surface is a generally aspherical surface, said second part being formed of synthetic resin material and said first part being formed of a material having a refractive index $n_1$ having a value between 1.65 and 2, wherein the Abbe number $V_1$ of the first part and the Abbe number $V_0$ of the second part comply with the following relation:

$$1.16 \leq \frac{V_1}{V_0} \leq 1.74.$$

The invention provides an objective capable of being used to read out data from different optical record carrier formats, such as DVD and HD-DVD, using radiation of different wavelengths whilst providing for the selection of materials for the objective capable of correcting for spherochromatism in the optical record carrier. Since only refractive surfaces are involved the objective does not suffer from efficiency losses as in the case of diffractive optical elements. Furthermore, since relatively few steps are needed to make the dual-compatible lens, it is a cost effective solution.

It would be possible to use a refractive single element objective made of one material, in order for the amount of spherical aberration generated by the objective to compensate the amount of spherical aberration generated by a cover layer of the disk, while the objective also fulfils the Abbe Sine condition. However, then the refractive index of the lens material would need to be larger than 2. Materials with refractive index larger than 2 tend to be expensive and have a low Abbe number, thus being sensitive to small wavelength variations.

Figure 2:
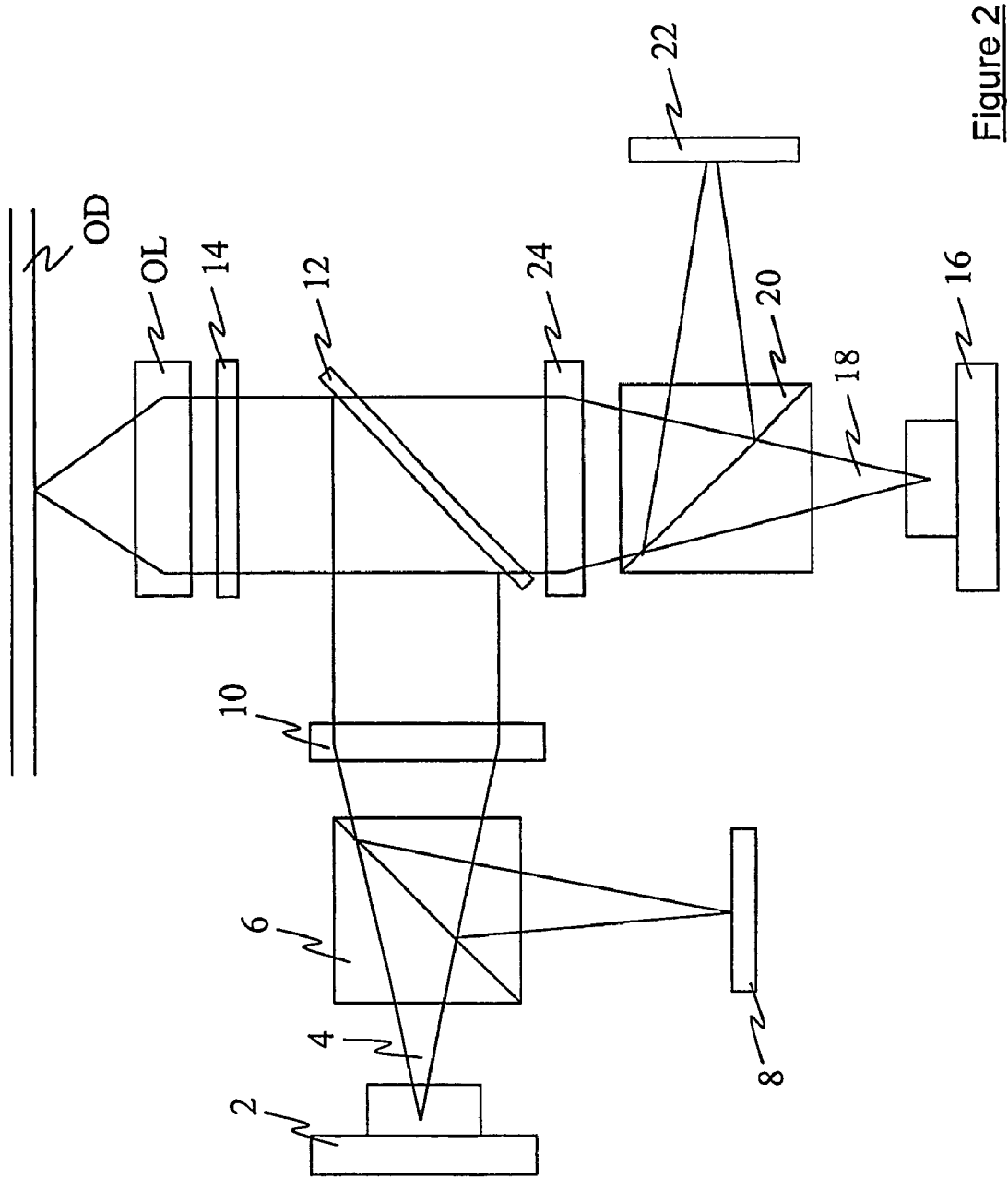

The objects, advantages and features of the invention will be apparent from the following more particular description of preferred embodiments of the invention, as illustrated in the accompanying drawings, in which FIG. 1 shows a schematic cross-section of an objective lens in accordance with an embodiment of the invention; and FIG. 2 shows a schematic cross-section of an optical scanning device in accordance with an embodiment of the invention.

DESCRIPTION

FIG. 1 shows an objective lens OL in accordance with one embodiment of the invention. The aspherical objective OL is formed from a plano-spherical glass body A with a thin aspherical correction layer made from a synthetic resin material shaped to fit and bonded to the convex surface of the glass body. The lens may be produced in a manner similar to that discussed in U.S. Pat. No. 4,623,496, the contents of which are incorporated herein by reference.

In the following, the design of the lens parameters is described in detail.

A third order Seidel analysis of the wavefront aberrations of the lens can be made. Let the resin have refractive index $n_0$, Abbe number $V_0$, thickness on the optical axis $d_0$, curvature $c_0$ (power $K_0$) and fourth order coefficient G determining the deviation from the spherical shape of the layer. The plano-spherical glass body (flat surface facing the disk) has refractive index $n_1$, Abbe number $V_1$, the thickness $d_1$ and curvature $c_1$ (power $K_1$) while the disk has refractive index $n_3$, Abbe number $V_3$ and the thickness $d_3$. The free working distance, hence the distance between the lens and the disk, is $d_2$.

Since the aspheric layer is thin the following approximations can be made:

$d_0 \approx 0$ $c_0 \approx c_1 = c$ $K = K_0 + K_1 \approx (n_1 - 1)c$

Using these approximations the third order Seidel term for spherical aberration $S_I$ is found to be:

$$S_I = \frac{NA^4}{(n_1-1)^4 c}\left(\frac{8G(n_0-1)}{c^3} + (n_1-1)\left(n_1 - 2n_1 + \frac{2}{n_1}\right)\right) +$$

$$NA^4 \frac{d_1}{n_1}\left(\frac{1}{n_1^2}-1\right) \ldots + NA^4 \frac{d_3}{n_3}\left(\frac{1}{n_3^2}-1\right)$$

while the term for coma aberration is given by:

$$S_{II} = NA^3 \eta$$

$$\left[\frac{1-n_1(n_1-1)}{n_1(n_1-1)} + (n_1-1)c\left(\frac{d_1}{n_1}\left(1-\frac{1}{n_1^2}\right) + \frac{d_3}{n_3}\left(1-\frac{1}{n_3^2}\right)\right)\right]$$

where the focus relation is given by:

$$\frac{d_1}{n_1} + d_2 + \frac{d_3}{n_3} = \frac{1}{K}$$

In order for the lens solutions not to introduce spherical aberration for either the DVD case or for the HD-DVD case and to comply with the Abbe Sine condition the coma term should be zero for the DVD case. Hence the solutions should fulfill the conditions:

$S_I(660\ nm)=0$ $S_I(405\ nm)=0$ $S_{II}(660\ nm)=0$

From $S_{II}(660\ nm)=0$ it follows that, in order to have $d_1>0$, the refractive index $n_1$ should fulfill the relation:

$$n_1 = \frac{1}{2} + \frac{1}{2}\sqrt{1 + \frac{4}{1 - \frac{d_3}{n_3}\left(1 - \frac{1}{n_3^2}\right)K}}$$

Inserting the values for a disk: $d_3=0.6$ mm, $n_3=1.58$ and, using a typical value $K\sim 0.35$ mm$^{-1}$, we find that $n_1>1.65$.

Note that when solving $S_I(660\ nm)=0$, $S_I(405\ nm)=0$ and $S_{II}(660\ nm)=0$ while taking $n_0=n_1$ and $V_0=V_1$ we find that $n_1>2.0$ which is not a practical solution.

The following relates to the case where the aspheric layer and the glass body have different properties as per the present invention. The following approximate relation between the Abbe number and the actual difference between the refractive index at 660 nm and 405 nm holds:

$$\Delta n \equiv n(405\ nm) - n(660\ nm) \approx 2\frac{n-1}{V}$$

Using the above relation we find from $S_I(660\ nm)=0$, $S_I(405\ nm)=0$ and $S_{II}(660\ nm)=0$ after eliminating G and $d_1$ the following relation for $n_1$:

$$\frac{F}{V_0(n_1-1)^2 n_1} = \frac{d_3(n_3-1)}{n_3^2 V_3}\left(1 - \frac{3}{n_3^2}\right) \ldots -$$

$$\frac{[(1+2n_1-5n_1^2-n_1^3+n_1^4)F + \frac{d_3}{n_3}\left(1-\frac{1}{n_3^2}\right)n_1(n_1-1)^2(n_1^2-3)]}{(n_1-1)^2 n_1^2(n_1+1)V_3}$$

where $F=1/K$. Note that this equation no longer contains $n_0$. Solving the above equation using $d_3=0.6$ mm and, typically, $n_3=1.58$ and $V_3=30$ while taking $F\sim 3$ mm we find that in order to have $1.65<n_1<2.0$ that:

$$1.16 \leq \frac{V_1}{V_0} \leq 1.74$$

$$2.7 \leq n_1 + 0.7\frac{V_1}{V_0} \leq 2.9$$

Since this is only a third order calculation the results are only a first estimation. Therefore, ray-tracing may be used in order to improve these results. We investigate the case where F=2.75 mm and the numerical aperture of the system is NA=0.65 for the DVD system. In building the merit function we used the wavefront aberration on axis and at 0.5° field for both the DVD and HD-DVD configuration. Table I shows the properties of the materials, in one embodiment, of which the aspheric layer is made (Diacryl) and of the disk (Polycarbonate).

TABLE I

|  | n(660 nm) | n(405 nm) | V |
|---|---|---|---|
| Diacryl | 1.5640 | 1.5945 | 34.5 |
| Polycarbonate | 1.5798 | 1.6188 | 29.9 |

Table II shows the parameters are listed defining the objective lens, in four different exemplary glass types, while Table III shows the corresponding wavefront aberrations for the four examples.

The rotational symmetric shape can be described by the equation $$z(r) = \frac{c_0 r^2}{1 + \sqrt{1 - c_0^2 r^2}} + B_4 + B_6 + B_8 + B_{10} + B_{12} + B_{14}$$

with z being the position of the surface in the direction of the optical axis in millimetres, r the distance to the optical axis in millimetres, and $B_k$ the coefficient of the k-th power of r. The values of $B_4$ to $B_{14}$ for the surface of the objective lens facing the radiation source are tabulated in Table II for all the four cases.

TABLE II

| | Example | | | |
|---|---|---|---|---|
| | 1 | 2 | 3 | 4 |
| Glass type | LAK10 (Schott) | LAFN28 (Schott) | S-LAH59 (Ohara) | LASFN31 (Schott) |
| $n_1$(660 nm) | 1.71548 | 1.76822 | 1.81051 | 1.87400 |
| $n_1$(405 nm) | 1.74436 | 1.79976 | 1.84608 | 1.91811 |
| $V_1$ | 50.4 | 49.6 | 46.6 | 41.0 |
| $d_0$ (mm) | 0.027 | 0.019 | 0.021 | 0.020 |
| $d_1$ (mm) | 1.911 | 2.281 | 2.6528 | 3.1158 |
| $c_0$ (mm$^{-1}$) | 0.5089 | 0.4804 | 0.4577 | 0.4258 |
| $c_1$ (mm$^{-1}$) | 0.4545 | 0.4367 | 0.4132 | 0.3861 |
| $B_4$ (mm$^{-3}$) | −0.0038692065 | −0.0077669621 | −0.007358103 | −0.0061609467 |
| $B_6$ (mm$^{-5}$) | −0.013928053 | −0.0034012771 | −0.0015370307 | −0.00077627718 |
| $B_8$ (mm$^{-7}$) | 0.011563615 | 0.0015918806 | 0.000077327348 | −0.0002798011 |
| $B_{10}$ (mm$^{-9}$) | −0.0064570315 | −0.0010955801 | −0.0002126324 | 0.00004604568 |
| $B_{12}$ (mm$^{-11}$) | 0.0017295657 | 0.00029753255 | 0.000057256433 | −0.000013221979 |
| $B_{14}$ (mm$^{-13}$) | −0.0001972081 | −0.00003802723 | −9.3622897 10$^{-6}$ | 8.9758754 10$^{-8}$ |

TABLE III

| | Example | | | |
|---|---|---|---|---|
| | 1 | 2 | 3 | 4 |
| On axis (660 nm) | 23.8 mλ | 18.9 mλ | 17.9 mλ | 18.5 mλ |
| 0.5° field (660 nm) | 38.3 mλ | 30.4 mλ | 30.7 mλ | 31.6 mλ |
| On axis (405 nm) | 26.7 mλ | 11.8 mλ | 11.1 mλ | 11.2 mλ |
| 0.5° field (405 nm) | 51.2 mλ | 48.0 mλ | 39.8 mλ | 35.2 mλ |

From the ray-trace results, it was derived that plano-aspheric glass replica lenses suitable for reading/writing DVD (660 nm) and reading/writing HD-DVD (405 nm) should preferably comply with the relations:

$$n_1 > 1.65$$

$$1.16 \leq \frac{V_1}{V_0} \leq 1.74$$

$$2.46 \leq n_1 + 0.55\frac{V_1}{V_0} \leq 2.66$$

$$9.96 \leq 6.99 n_1 + d_1 \leq 10.32$$

with $d_1$ expressed in millimeters

Due to the higher order terms the results deviate slightly from the results obtained from the third order analysis.

Reference is now made to FIG. 2. In accordance with embodiments of the invention, including in a first specific embodiment the DVD and HD-DVD case, different formats of optical disk, may be written and/or read-out by means of an optical pickup unit (OPU) such as that shown. The optical components of the OPU are held in a rigid housing which is formed of moulded aluminium or suchlike. The OPU is arranged in an optical recording and/or playback device such that the OPU travels along a linear bearing arranged radially of the disk during scanning of the disk. Each disk to be scanned is located in a planar scanning area adjacent to the OPU, mounted on a motorised rotating bearing in the playback and/or recording device, whereby the disk is moved relative to the OPU during playback and/or writing.

Each of the different formats of disk to be scanned by the device includes at least one information layer. Information may be stored in the information layer or layers of the optical disk in the form of optically detectable marks arranged in substantially parallel, concentric or spiral tracks. The marks may be in any optically readable form, for example in the form of pits or areas with a reflection coefficient different from their surroundings.

The OPU includes two optical branches for scanning disks with radiation of two different wavelengths, in this embodiment a wavelength of approximately 650 nm (referred to herein as "the red wavelength") and a wavelength of approximately 405 nm (referred to herein as "the blue wavelength"). It should however be appreciated that optical scanning devices in accordance with different embodiments of the invention may operate at other wavelengths, and with more than two wavelengths.

A first optical branch which includes a polarised radiation source 2, for example a semiconductor laser, operating at a predetermined wavelength, in this example the wavelength, to produce a first beam 4. The first branch further includes a polarising beam splitter 6 for reflecting the returned beam towards a detector system 8, and a collimator lens 10 for producing a more collimated beam.

A dichroic beam splitter 12 reflects the first beam 4 towards the optical disk OD. In the optical path portion between the beam splitter 12 and the optical disk OD, which portion is shared by the two radiation beams of the device, lie a quarter wavelength plate 14, operative at both the red wavelength and the blue wavelength, a dichroic aperture, operative to reflect radiation at the red wavelength in an area outside a predetermined radial distance from the optical axis, and a dual beam objective lens OL in accordance with the invention. The dual beam objective lens is adapted for correctly focusing, with limited spherical aberration, the collimated red wavelength beam to a spot on the information layer in a disk, such as a dual-layer DVD disk, operative at the red wavelength, and a collimated blue wavelength beam to a spot on an information layer in a disk, such as an HD-DVD disk, operative at the blue wavelength.

The first beam is altered in polarisation from linear to circular polarisation by quarter wave plate 14 and focused by objective lens OL to a spot on the disk OD. The reflected beam follows a return path, being transformed back to a beam exhibiting linear polarisation perpendicular to the incident beam by the quarter wave plate 14, and is reflected by beam splitter 6 towards a photodiode detector array arranged in detector system 8, where the data, focus error and tracking error signals are detected. The objective lens OL is driven by servo signals derived from the focus error signal to maintain the focussed state of the spot on the optical disk OD and from the tracking error signal to maintain alignment with a track on the disk OD currently being read.

The second optical branch in this embodiment includes a polarised radiation source 16, for example a semiconductor laser, operating at a predetermined wavelength different to that of the first beam, in this example the blue wavelength, to produce a second beam 18. The optical path for the second beam includes polarising a beam splitter 20 for redirecting the return beam for focus and radial tracking error signal generation at a detector array system 22 and a collimator lens 24 for substantially collimating the second beam. The second beam is transmitted substantially fully by the dichroic mirror 12, is altered in polarisation from linear to circular polarisation by quarter wave plate 14, and focused to a spot on an information layer in the disk OD. The reflected beam follows a return path, being transformed back to a beam exhibiting linear polarisation perpendicular to the incident beam by the quarter wave plate 14, and is reflected by beam splitter 20 towards a photodiode detector array arranged in detector system 22, at which a data signal and tracking and focus error signals are detected. The objective lens OL is driven by servo signals derived from the focus error signal to maintain the focussed state of the spot on the optical disk 10 and the detector array, and from the tracking error signals to maintain alignment with the track currently being scanned.

The numeric aperture (NA) of the objective OL, as used in the case of both the red and blue wavelengths, is greater than 0.5, and more preferably greater than 0.55. In one embodiment, an NA of 0.6 is used. In a different embodiment, an NA of 0.65 is used.

The above embodiments are to be understood as illustrative examples of the invention. Further embodiments of the invention are envisaged. It is to be understood that any feature described in relation to one embodiment may also be used in other of the embodiments. Furthermore, equivalents and modifications not described above may also be employed without departing from the scope of the invention, which is defined in the accompanying claims.

The invention claimed is:

1. An optical element comprising a first part and a second part, wherein said first part is shaped to comprise a first surface and an opposing second surface, said second part is shaped to comprise a third surface and an opposing fourth surface, said first surface is of a convex shape providing a main part of the lens power, said third surface is shaped to fit said first surface, and wherein said fourth surface is a generally aspherical surface, said second part being formed of synthetic resin material and said first part being formed of a material having a refractive index $n_1$ having a value between 1.65 and 2, wherein the Abbe number $V_1$ of the first part and the Abbe number $V_0$ of the second part comply with the following relation:

$$1.16 \leq \frac{V_1}{V_0} \leq 1.74.$$

2. An optical element according to claim 1, wherein said first part is a plano-convex part.

3. An optical element according to claim 1, wherein said first surface is of a generally spherical shape.

4. An optical element according to claim 1, wherein said first part is formed of a glass material.

5. An optical element according to claim 1, wherein the refractive index $n_1$ and the Abbe number $V_1$ of the first part and the Abbe number $V_0$ of the second part comply with the following relation:

$$2.46 \leq n_1 + 0.55\frac{V_1}{V_0} \leq 2.66.$$

6. An optical element according to claim 1, wherein the refractive index $n_1$ and the thickness $d_1$ of the first part comply with the following relation:

$$9.96 \leq 6.99n_1 - d_1 \leq 10.32,$$

with $d_1$ expressed in millimeters.

7. An optical scanning device comprising an optical element according to claim 1.

8. An optical scanning device according to claim 7, wherein the element is a lens having a numeric aperture greater than 0.5.

* * * * *